US011313565B2

(12) United States Patent
Xia et al.

(10) Patent No.: US 11,313,565 B2
(45) Date of Patent: Apr. 26, 2022

(54) COOKER HOOD AND FILTERING DEVICE THEREOF

(71) Applicant: BSH Hausgeräte GmbH, Munich (DE)

(72) Inventors: Zhaoyang Xia, Nanjing (CN); Yongzhi Yang, Shanxi (CN); Jing Liao, Nanjing (CN); Jun Li, Nanjing (CN)

(73) Assignee: BSH Hausgeräte GmbH, Munich (DE)

( * ) Notice: Subject to any disclaimer, the term of this patent is extended or adjusted under 35 U.S.C. 154(b) by 216 days.

(21) Appl. No.: 16/850,105

(22) Filed: Apr. 16, 2020

(65) Prior Publication Data

US 2020/0340681 A1 Oct. 29, 2020

(30) Foreign Application Priority Data

Apr. 28, 2019 (CN) ........................ 201910348622.6

(51) Int. Cl.
*F24C 15/20* (2006.01)
*B08B 15/02* (2006.01)
*B01D 45/08* (2006.01)

(52) U.S. Cl.
CPC .......... *F24C 15/2035* (2013.01); *B08B 15/02* (2013.01); *F24C 15/2042* (2013.01)

(58) Field of Classification Search
CPC .. F24C 15/20; F24C 15/2042; F24C 15/2035; B01D 45/08; B01D 45/16; B01D 50/40; B01D 50/002
See application file for complete search history.

(56) References Cited

U.S. PATENT DOCUMENTS 3,910,782 A * 10/1975 Struble .................. B01D 45/08 55/444
5,342,422 A * 8/1994 Wimbock .............. B01D 45/08 55/444
5,624,607 A * 4/1997 Kanai ................. C04B 22/0066 252/606
7,581,539 B2 * 9/2009 Aviles .................... B01D 45/08 126/299 D
10,835,851 B2 * 11/2020 Parvin .................... B01D 39/14
10,953,357 B2 * 3/2021 Jeong ..................... B01D 46/10
(Continued)

FOREIGN PATENT DOCUMENTS

CN 104654410 B * 5/2017 .......... F24C 15/2035
JP 2005345080 A * 12/2005 ................ F24F 7/08
(Continued)

*Primary Examiner* — Jorge A Pereiro
*Assistant Examiner* — Nikhil P Mashruwala
(74) *Attorney, Agent, or Firm* — Michael E. Tschupp; Andre Pallapies; Brandon G. Braun

(57) ABSTRACT

A filtering device of a cooker hood is configured in a V shape with an upward opening as a whole, and includes a V-shaped inner surface and a V-shaped outer surface. A tube portion is embedded between the inner surface and the outer surface, both ends of the tube portion being closed. The tube portion has a V shape with an upward opening. The tube portion includes an air inlet and an air outlet disposed in an interleaved manner, with the air inlet being located on the outer surface, and the air outlet being located on the inner surface. In this way, a rotating airflow is suitable to be formed in the tube portion of the filtering device, thereby improving a grease separation effect.

14 Claims, 2 Drawing Sheets

(56) References Cited

U.S. PATENT DOCUMENTS

| | | | | |
|---|---|---|---|---|
| 2005/0000199 | A1* | 1/2005 | Carter | B01D 45/08 55/442 |
| 2009/0019822 | A1* | 1/2009 | Feisthammel | B01D 45/08 55/385.4 |
| 2009/0032011 | A1* | 2/2009 | Livchak | F24C 15/20 126/299 D |
| 2010/0269463 | A1* | 10/2010 | Duffy | B01D 46/521 55/483 |
| 2013/0133639 | A1* | 5/2013 | Lee | F24C 15/2035 126/299 D |
| 2020/0041140 | A1* | 2/2020 | Mitchell | B01D 45/08 |
| 2021/0055002 | A1* | 2/2021 | Chartrel | B01D 46/0019 |

FOREIGN PATENT DOCUMENTS

| | | | | | |
|---|---|---|---|---|---|
| JP | 2019081139 | A | * | 5/2019 | B01D 53/74 |
| WO | WO 2029212260 | A1 | * | 10/2020 | F24C 15/20 |

* cited by examiner

COOKER HOOD AND FILTERING DEVICE THEREOF

CROSS-REFERENCES TO RELATED APPLICATIONS

This application claims the priority of Chinese Patent Application, Serial No. 201910348622.6, filed Apr. 28, 2020, pursuant to 35 U.S.C. 119(a)-(d), the disclosure of which is incorporated herein by reference in its entirety as if fully set forth herein.

BACKGROUND OF THE INVENTION

This application relates to the field of cooker hoods, and in particular, to a filtering device of a cooker hood.

An existing cooker hood is generally provided with a filtering device, such as a filter screen and a filter plate. The filtering device of conventional cooker hoods suffers many shortcomings and lacks improvements and breakthroughs.

Unless there is sufficient evidence, the prior art described herein does not mean that it is recognized that the prior art is well known to those of ordinary skill in the art to which this application relates before the filing date of this application.

It would be desirable and advantageous to provide an improved cooker hood with improved filtering device to obviate prior art shortcomings.

BRIEF SUMMARY OF THE INVENTION

According to one aspect of the present invention, a filtering device of a cooker hood is configured in a V shape with an upward opening as a whole, and includes a V-shaped inner surface and a V-shaped outer surface. A tube portion is embedded between the inner surface and the outer surface, with both ends of the tube portion being closed, and with the tube portion being in a V shape with an upward opening. The tube portion includes an air inlet and an air outlet disposed in an interleaved manner, the air inlet being located on the outer surface, and the air outlet being located on the inner surface.

As a result of a filtering device in accordance with the present invention, a rotating airflow is generated in the tube portion of the filtering device, thereby improving a grease separation effect.

According to another advantageous feature of the present invention, provision may be made for at least two tube portions.

According to another advantageous feature of the present invention, a length of the air outlet can be less than a length of the corresponding air inlet. In this way, a rotating airflow can be formed in the tube portion of the filtering device, thereby further improving the grease separation effect.

According to another advantageous feature of the present invention, each of the air inlet and the air outlet can be in a V shape with an upward opening.

According to another advantageous feature of the present invention, a longitudinal section of the filtering device can include at least two Z-shaped sections; with an upper free end of the Z-shaped section corresponding to an edge of an air outlet of a tube portion, and a lower free end of the Z-shaped section corresponding to an edge of an air inlet of another adjacent tube portion.

According to another advantageous feature of the present invention, the lower free end of the Z-shaped section can be bent toward an interior of the corresponding tube portion to form a guide hem.

According to another advantageous feature of the present invention, the filtering device can include an oil cup of elongated strip shape, with the oil cup being suspended at an included angle of the V-shaped outer surface; and the tube portions can be sequentially arranged along a direction in which the oil cup extends. This facilitates grease collection.

According to another aspect of the present invention, a cooker hood includes a filtering device as set forth above.

According to another advantageous feature of the present invention, the cooker hood can be embodied as a ceiling cooker hood, with two faces of the V-shaped outer surface being disposed one behind the other.

According to another advantageous feature of the present invention, the cooker hood can include a smoke collection chamber; and the filtering device can be at least partially disposed in the smoke collection chamber, with an air inlet gap being formed between the filtering device and the smoke collection chamber at an interval. Disposing of the air inlet gap facilitates flowing of airflows.

The content of the foregoing invention of this application is not used for describing all possible implementations of this application. In the entire application, guidance is provided at many parts by listing examples, and these examples may be used for various feasible combinations.

BRIEF DESCRIPTION OF THE DRAWINGS

The following accompanying drawings merely make exemplary description and explanation on this application, and are not used for limiting the scope of this application. The drawings show in.

DETAILED DESCRIPTION OF EXEMPLARY EMBODIMENTS OF THE PRESENT INVENTION

To make the purpose, technical solutions, and beneficial effects of this application clearer, this application is further described below with reference to the accompanying drawings and the preferred embodiments.

Figure 1:
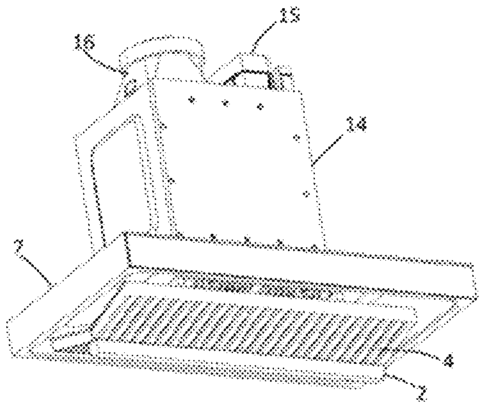
FIG. 1 a perspective illustration of a cooker hood according to the present invention.
Figure 2:
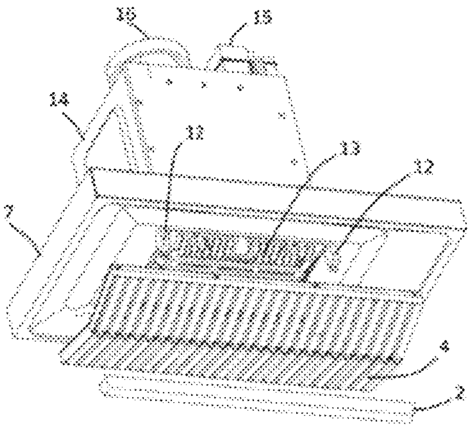
FIG. 2 an exploded view of the cooker hood shown in FIG. 1.

Turning now to FIGS. 1 and 2, there are shown two schematic illustrations of a cooker hood according to the present invention. The cooker hood includes a filtering device 1, a smoke collection chamber 7, a fan, a chassis 14, an electrical box 15, and an air duct holder 16. The cooker hood is a ceiling cooker hood and is in an inverted T shape as a whole, with the smoke collection chamber 7 suspended below the chassis 14. The fan is disposed in the chassis 14. A smoke exhaust opening for conveying an airflow to the fan in the chassis 14 is disposed on the top of the smoke collection chamber 7, and a safety filter screen 13 is disposed at the smoke exhaust opening, as shown in FIG. 2. When the fan is running, the smoke collection chamber 7 guides the airflow to the safety filter screen 13. The electrical box 15 and the air duct holder 16 are both disposed on the top of the chassis 14. The filtering device 1 is disposed below the smoke exhaust opening, i.e. the filtering device 1 is disposed below the safety filter screen 13.

As viewed from a perspective of the left or right side of the cooker hood, the filtering device 1 has a V-shaped configuration with an upward opening as a whole. The filtering device 1 includes a V-shaped inner surface 3 and a V-shaped outer surface 4, as shown in FIG. 1 to FIG. 5. In other words, from the perspective of the left or right side of the cooker hood, the inner surface 3 is in a V shape with an upward opening, and the outer surface 4 is in a V shape with an upward opening.

The V-shaped inner surface 3 and the V-shaped outer surface 4 are substantially parallel to each other. An included angle of the V-shaped inner surface 3 and an included angle of the V-shaped outer surface 4 are substantially equal, and both are obtuse angles, as shown in FIG. 1 to FIG. 5. Because the filtering device 1 is generally in a V shape with an upward opening as a whole, V-shaped air inlets are formed on the left and right sides of the filtering device 1, as shown in FIG. 1.

The V-shaped outer surface 4 of the filtering device 1 is in a tiled roof shape in an inverted state, as shown in FIG. 1. Two faces of the V-shaped outer surface 4 are disposed one behind the other, as shown in FIG. 1. A non-porous side wall is provided around the filtering device 1, and the non-porous side wall is located between the V-shaped inner surface 3 and the V-shaped outer surface 4.

A tube portion is embedded between the inner surface 3 and the outer surface 4, both ends of the tube portion being closed (in this embodiment, both ends of the tube portion being closed by the non-porous side wall described above), with the tube portion being in a V shape with an upward opening. In other words, from the perspective of the left or right side of the cooker hood, the tube portion is in a V shape with an upward opening.

The tube portion includes an air inlet 5 and an air outlet 6 disposed in an interleaved manner (i.e., the air inlet 5 and the air outlet 6 of the same tube portion are disposed in an interleaved manner), with the air inlet 5 being located on the outer surface 4, and the air outlet 6 being located on inner surface 3. The expression that "the air inlet 5 and the air outlet 6 of the same tube portion are disposed in an interleaved manner" may be understood as relating to a direction in which an airflow flows into the air inlet 5, wherein the air inlet 5 and the air outlet 6 of the same tube portion do not overlap or do not completely overlap. In this way, when a cooking fume flowing from the air inlet 5 flows to the corresponding air outlet 6, an airflow of the cooking fume rotates to some degree (instead of flowing along a straight line), thereby facilitating grease filtering.

Figure 3:
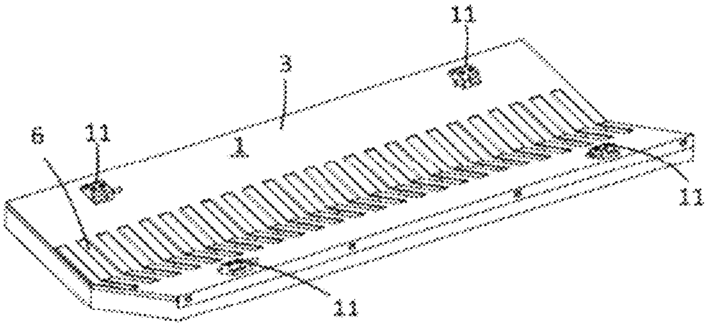
FIG. 3 a schematic perspective illustration of a filtering device of the cooker hood.

The filtering device includes 25 tube portions, and correspondingly, there are 25 air inlets 5 and 25 air outlets 6. Each of the air outlets 6 is in a V shape with an upward opening, as shown in FIG. 3. Each of the air inlets 5 is in a V shape with an upward opening, as shown in FIG. 1. In this embodiment, each air outlet 6 is substantially parallel to a corresponding air inlet 5. Grease adhered to the safety filter screen 13 drips onto the V-shaped inner surface 3 of the filtering device 1 or drops into the tube portion through the air outlet 6.

A length of the air outlet 6 is less than a length of the corresponding air inlet 5, i.e. a length of an air outlet 6 of any tube portion is less than a length of an air inlet 5 of the tube portion. In this embodiment, the length of the air outlet 6 is approximately one-half the length of the corresponding air inlet 5. The air outlet 6 is located in the middle of the corresponding tube portion, as shown in FIG. 3. The air inlet 5 extends from one end of the corresponding tube portion to the other end (the "one end" and "the other end" are the above-mentioned closed "both ends"), as shown in FIG. 1 and FIG. 2. In this way, airflows flowing from the air inlet 5 converge toward the middle of the tube portion to be discharged from the corresponding air outlet 6.

Figure 4:
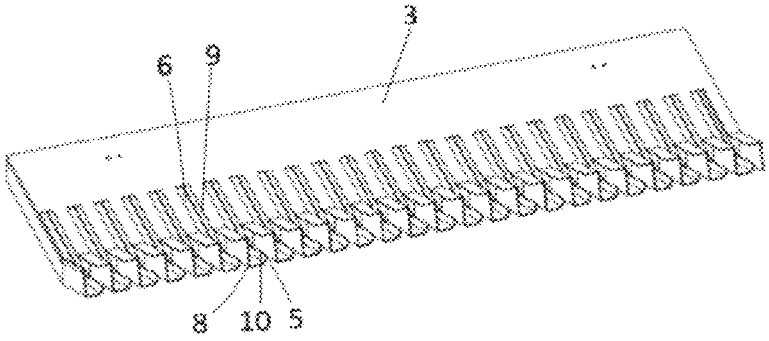
FIG. 4 a sectional view of the filtering device shown in FIG. 3.
Figure 5:
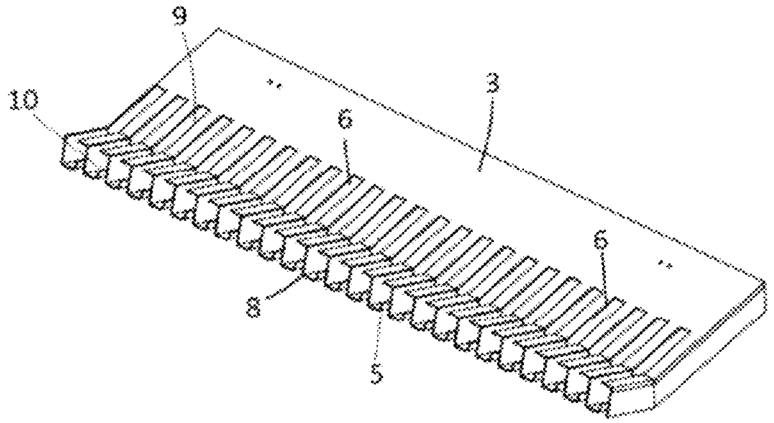
FIG. 5 another view of the filtering device shown in FIG. 4.

A longitudinal section of the filtering device 1 includes 24 Z-shaped sections 8, as shown in FIG. 4 and FIG. 5. An upper free end 9 of each of the Z-shaped sections 8 corresponds to an edge of an air outlet 6 of a tube portion, and a lower free end 10 of the Z-shaped section 8 corresponds to an edge of an air inlet 5 of another adjacent tube portion. The lower free end 10 of the Z-shaped section 8 is bent toward an interior of the corresponding tube portion to form a guide hem.

The filtering device 1 further includes an oil cup 2 of elongated strip shape. The oil cup 2 is suspended at an included angle of the V-shaped outer surface 4, as shown in FIG. 1. The oil cup 2 is disposed on a top ridge of the V-shaped outer surface 4 in a tiled roof shape. The tube portions are sequentially arranged along a direction in which the oil cup 2 extends. Each tube portion is provided with an oil leakage hole at a bottom end of the tube portion, and grease in each tube portion passes through the oil leakage hole and flows into the oil cup 2. No oil cup 2 is mounted on the filtering device 1 shown in FIG. 3 to FIG. 5.

The filtering device 1 is partially disposed in the smoke collection chamber 7, with an air inlet gap being formed between the filtering device 1 and the smoke collection chamber 7 at an interval. In particular, an air inlet gap is formed between the filtering device 1 and a guide wall of the smoke collection chamber 7 at an interval. The V-shaped air inlets on the left and right sides of the filtering device 1 communicate with the air inlet gaps. When the fan is running, a part of airflows passes through the air inlet gap and the V-shaped air inlets on the left and right sides of the filtering device 1 and then flows through the safety filter screen 13, and flows into the chassis 14 and is then discharged from the air duct holder 16. The other part of airflows flows from each air inlet 5 and flows through a corresponding tube portion, then flows out of a corresponding air outlet 6 and flows through the safety filter screen 13, and flows into the chassis 14 and is then discharged from the air duct holder 16. After an airflow flows out of the air duct holder 16, the airflow flows into a public pipe through an exhaust pipe (not shown).

The inner surface 3 of the filtering device 1 is provided with four connecting members 11, as shown in FIG. 3. No connecting member 11 is mounted on the filtering device 1 shown in FIG. 4 and FIG. 5. The smoke collection chamber 7 is provided with four fixing members 12. The four connecting members 11 are in a one-to-one correspondence with the four fixing members 12. Each connecting member 11 is disposed to be detachably fixed to a corresponding fixing member 12. When each connecting member 11 is fixed to the corresponding fixing member 12, the filtering device 1 is fixed to the cooker hood, as shown in FIG. 1.

The V-shape mentioned in this application is a substantially V-shape, and the V-shape may form an included angle or may not form an included angle. For example, there is a smooth transition structure at a position of the included angle.

The above is only one embodiment of this application, and other embodiments may be obtained by adding, deleting, modifying, or replacing some technical features. For example, an included angle of the V-shaped inner surface is greater than an included angle of the V-shaped outer surface.

For another example, an included angle of the V-shaped inner surface is less than an included angle of the V-shaped outer surface.

It should be noted herein that, unless otherwise specified, orientation expressions in this application such as "upward opening", "one behind the other", "upper free end", "lower free end", "left and right sides", "bottom end", "below", and "top" are approximately based on usual use statuses of the cooker hood and the filtering device as shown in FIG. 1.

Components of different embodiments may be combined together in any feasible manner, to implement the purpose of this application.

It should be additionally noted that, this application should not be understood as being limited to the embodiments described above, and should be understood as covering all possible embodiments determined according to the claims of this application and the content disclosed in this specification. Therefore, any simple change, equivalent variation, and modification made on the foregoing embodiments according to the technical essence without departing from the content of the technical solution of this application shall fall within the protection scope of the technical solution of this application.

What is claimed is:

1. A filtering device of a cooker hood, said filtering device being configured in a V shape with an upward opening as a whole and comprising:

a V-shaped inner surface;

a V-shaped outer surface; and a tube portion embedded between the inner surface and the outer surface and having two closed ends, said tube portion being configured in a V shape with an upward opening and comprising an air inlet and an air outlet disposed in an interleaved manner, with the air inlet being located on the outer surface, and the air outlet being located on the inner surface, wherein a longitudinal section of the filtering device comprises at least two Z-shaped sections, with each of the at least two Z-shaped sections having an upper free end which corresponds to an edge of the air outlet of the tube portion, and a lower free end which corresponds to an edge of an air inlet of another one of said tube portion adjacent to the tube portion.

2. The filtering device of claim 1, further comprising at least a further one of said tube portion.

3. The filtering device of claim 1, wherein the air outlet has a length which is less than a length of the air inlet.

4. The filtering device of claim 1, wherein the air inlet and the air outlet are each configured in a V shape with an upward opening.

5. The filtering device of claim 1, wherein the lower free end of the Z-shaped section is bent toward an interior of the corresponding one of the tube portions to form a guide hem.

6. The filtering device of claim 2, further comprising an oil cup having an elongated strip shape, said oil cup being suspended at an included angle of the V-shaped outer surface, said tube portions being sequentially arranged along a direction in which the oil cup extends.

7. A cooker hood, comprising a filtering device configured in a V shape with an upward opening as a whole, said filtering device comprising a V-shaped inner surface, a V-shaped outer surface, and a tube portion embedded between the inner surface and the outer surface and having two closed ends, said tube portion being configured in a V shape with an upward opening and comprising an air inlet and an air outlet disposed in an interleaved manner, with the air inlet being located on the outer surface, and the air outlet being located on the inner surface, wherein a longitudinal section of the filtering device comprises at least two Z-shaped sections, with each of the at least two Z-shaped sections having an upper free end which corresponds to an edge of the air outlet of the tube portion, and a lower free end which corresponds to an edge of an air inlet of another one of said tube portion adjacent to the tube portion.

8. The cooker hood of claim 7, wherein the filtering device includes at least a further one of said tube portion.

9. The cooker hood of claim 7, wherein the air outlet of the tube portion has a length which is less than a length of the air inlet.

10. The cooker hood of claim 7, wherein the air inlet and the air outlet are each configured in a V shape with an upward opening.

11. The cooker hood of claim 7, wherein the lower free end of the Z-shaped section is bent toward an interior of the corresponding one of the tube portions to form a guide hem.

12. The cooker hood of claim 8, wherein the filtering device includes an oil cup having an elongated strip shape, said oil cup being suspended at an included angle of the V-shaped outer surface, said tube portions being sequentially arranged along a direction in which the oil cup extends.

13. The cooker hood of claim 7, constructed in the form of a ceiling cooker hood, said V-shaped outer surface of the filtering device having two faces disposed one behind the other.

14. The cooker hood of claim 13, further comprising a smoke collection chamber, said filtering device being at least partially disposed in the smoke collection chamber, with an air inlet gap being formed between the filtering device and the smoke collection chamber at an interval.

* * * * *